US008487949B2

(12) United States Patent
Morimoto

(10) Patent No.: US 8,487,949 B2
(45) Date of Patent: Jul. 16, 2013

(54) IMAGE PROCESSING APPARATUS AND IMAGE PROCESSING METHOD

(75) Inventor: Masami Morimoto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1064 days.

(21) Appl. No.: 12/486,254

(22) Filed: Jun. 17, 2009

(65) Prior Publication Data

US 2010/0123731 A1 May 20, 2010

(30) Foreign Application Priority Data

Nov. 20, 2008 (JP) ................................ 2008-296860

(51) Int. Cl.
*G09G 5/02* (2006.01)
*G09G 3/36* (2006.01)
*G06K 9/00* (2006.01)

(52) U.S. Cl.
USPC .......... 345/589; 345/600; 345/603; 345/604; 345/590; 345/591; 345/87; 345/102; 382/162; 382/167; 382/168

(58) Field of Classification Search
USPC .......................... 345/589–605; 382/168–172
See application file for complete search history.

(56) References Cited

U.S. PATENT DOCUMENTS 7,403,318 B2 7/2008 Miyazawa et al.
7,746,530 B2 6/2010 Miyazawa et al.
7,768,688 B2 8/2010 Miyazawa et al.
7,825,893 B2 11/2010 Oka et al.
7,973,753 B2 7/2011 Mori
8,243,104 B2 8/2012 Someya et al.

(Continued)

FOREIGN PATENT DOCUMENTS

JP 2006-003586 A 1/2006
JP 2006-217424 A 8/2006

(Continued)

OTHER PUBLICATIONS

Raman, N.; Hekstra, G.; , “Dynamic contrast enhancement of liquid crystal displays with backlight modulation,” Consumer Electronics, 2005. ICCE. 2005 Digest of Technical Papers. International Conference on , vol., no., pp. 197-198, Jan. 8-12, 2005.*

(Continued)

*Primary Examiner* — Ke Xiao
*Assistant Examiner* — Donna Ricks
(74) *Attorney, Agent, or Firm* — Holtz, Holtz, Goodman & Chick, PC

(57) ABSTRACT

The RGB values of each pixel in every frame are converted into ideal tristimulus values X, Y, and Z. Based on a chromaticity-histogram based on the tristimulus values X, Y, and Z and a color gamut for each Y value corrected in accordance with a backlight-brightness, an xy error count generation unit obtains the number of chromaticity errors for each of a plurality of backlight-brightnesses. A lightness-histogram is created based on the RGB signals for each frame. Based on the histogram and a lightness higher than a maximum tone after correction according to the backlight-brightness, a lightness error count generation unit obtains the number of lightness errors for each of the plurality of backlight-brightnesses. An error minimum BL-brightness detection unit decides an optimum backlight-brightness based on the number of chromaticity errors and the number of lightness errors. A tone conversion unit performs tone conversion in accordance with the backlight-brightness.

14 Claims, 2 Drawing Sheets

U.S. PATENT DOCUMENTS

| | | | | |
|---|---|---|---|---|
| 2004/0184673 | A1* | 9/2004 | Watanabe | 382/274 |
| 2006/0221046 | A1 | 10/2006 | Sato et al. | |
| 2006/0247876 | A1* | 11/2006 | Yamada et al. | 702/81 |
| 2007/0120863 | A1* | 5/2007 | Kim et al. | 345/581 |
| 2007/0236713 | A1* | 10/2007 | Ishiguchi | 358/1.9 |
| 2008/0297463 | A1 | 12/2008 | Tsuru et al. | |
| 2009/0284546 | A1* | 11/2009 | Brown Elliott | 345/596 |
| 2010/0060911 | A1* | 3/2010 | Marcu et al. | 358/1.9 |

FOREIGN PATENT DOCUMENTS

| | | | |
|---|---|---|---|
| JP | 2006-276677 | A | 10/2006 |
| JP | 2006-284981 | A | 10/2006 |
| JP | 2008-107715 | A | 5/2008 |
| JP | 2008-129251 | A | 6/2008 |
| JP | 2008-176211 | A | 7/2008 |
| WO | WO 2006/025190 | A1 | 3/2006 |

OTHER PUBLICATIONS

Pei-Shan Tsai; Chia-Kai Liang; Chen, H.H.; , "Image Quality Enhancement for Low Backlight TFT-LCD Displays," Image Processing, 2007. ICIP 2007. IEEE International Conference on , vol. 3, no., pp. III-473-III-476, Sep. 16, 2007-Oct. 19, 2007.*

Anandan, M., LED Backlight: Enhancement of picture quality on LCD screen, Proceeding of ASID, 130-134 (2006).*

Lu, Y., et al., Resource-driven content adaptation, Computational Imaging IV, Proc. SPIE-IS&T Electronic Imaging, SPIE vol. 6065, 60650L, (2006).*

Cheng, L. et al., Quality-based backlight optimization for video playback on handheld devices, Advances in Multimedia, v.2007 n.1, p. 4-4, Jan. 2007.*

Japanese Office Action dated Sep. 4, 2012 (and English translation thereof) in counterpart Japanese Application No. 2008-296860.

* cited by examiner

IMAGE PROCESSING APPARATUS AND IMAGE PROCESSING METHOD

CROSS-REFERENCE TO RELATED APPLICATIONS

This application is based upon and claims the benefit of priority from prior Japanese Patent Application No. 2008-296860, filed Nov. 20, 2008, the entire contents of which are incorporated herein by reference.

BACKGROUND OF THE INVENTION

1. Field of the Invention

The present invention relates to an image processing apparatus for correcting an image displayed on a display panel using, e.g., a liquid crystal.

2. Description of the Related Art

As is known, when displaying an image on a display panel such as an LCD (Liquid Crystal Display), the backlight brightness is adjusted to be lower in a dark scene based on that in a bright scene. However, since the transmittance of the LCD does not sufficiently lower at a low tone level, such backlight control causes alienation from an ideal gamma.

Conventionally, the backlight brightness is adjusted to be lower, and the tone is adjusted to be higher to maintain the visual lightness of an image. This improves the tonality of a low tone image (e.g., Jpn. Pat. Appln. KOKAI Publication No. 2006-217424).

However, to adjust a visual brightness to a predetermined level, generally, the tone and backlight brightness are changed to make the maximum tone of an image as high as possible without changing the maximum brightness in the image (transmittance of maximum tone of the image×backlight brightness). This causes shift to the high tone side as a whole to improve the tonality of a low tone image but may make it impossible to ensure color reproductivity.

BRIEF SUMMARY OF THE INVENTION

The present invention has been made to solve the above problem, and has as its object to provide an image processing apparatus and an image processing method which can ensure color reproductivity when improving the tonality of a low tone image.

In order to achieve the above object, according to the present invention, there is provided an image processing apparatus comprising: a conversion unit which converts RGB values of each pixel into ideal tristimulus values X, Y, and Z; a Y histogram generation unit which obtains a Y histogram by adding frequencies of the tristimulus values X, Y, and Z of one frame for each Y; a Y value selection unit which selects a characteristic Y value based on the Y histogram; a chromaticity histogram generation unit which generates a chromaticity histogram for each Y value selected by the Y value selection unit; a color gamut information storage unit which stores, for each Y value, information of a color gamut representing a distribution of chromaticities displayable on a display panel; a chromaticity error count detection unit which obtains, for each backlight brightness, a frequency of a histogram out of a color gamut based on information of a color gamut corresponding to a value obtained by correcting the Y value selected by the Y value selection unit using a correction gain corresponding to the backlight brightness and the chromaticity histogram created by the chromaticity histogram generation unit; a lightness histogram creation unit which creates a lightness histogram from the RGB values of each pixel; a lightness error count detection unit which obtains, for each backlight brightness, a frequency of a histogram higher than a maximum tone based on a lightness corresponding to the maximum tone after correction using the correction gain corresponding to the backlight brightness and the lightness histogram created by the lightness histogram creation unit; a decision unit which decides a backlight brightness based on the number of chromaticity errors obtained by the chromaticity error count detection unit and the number of lightness errors obtained by the lightness error count detection unit; and a tone conversion unit which performs tone conversion of the RGB values of each pixel in accordance with the backlight brightness decided by the decision unit.

As described above, in the present invention, the number of chromaticity errors and the number of lightness errors are obtained for each of a plurality of backlight brightnesses. An optimum backlight brightness is decided based on the number of chromaticity errors and the number of lightness errors. Tone conversion is performed in accordance with the backlight brightness.

Hence, according to the present invention, an optimum backlight brightness is decided in consideration of the number of chromaticity errors and the number of lightness errors corresponding to a backlight brightness. Then, tone conversion according to the backlight brightness is performed. It is therefore possible to provide an image processing apparatus and an image processing method which can ensure color reproductivity when improving the tonality of a low tone image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawing.

Figure 1:
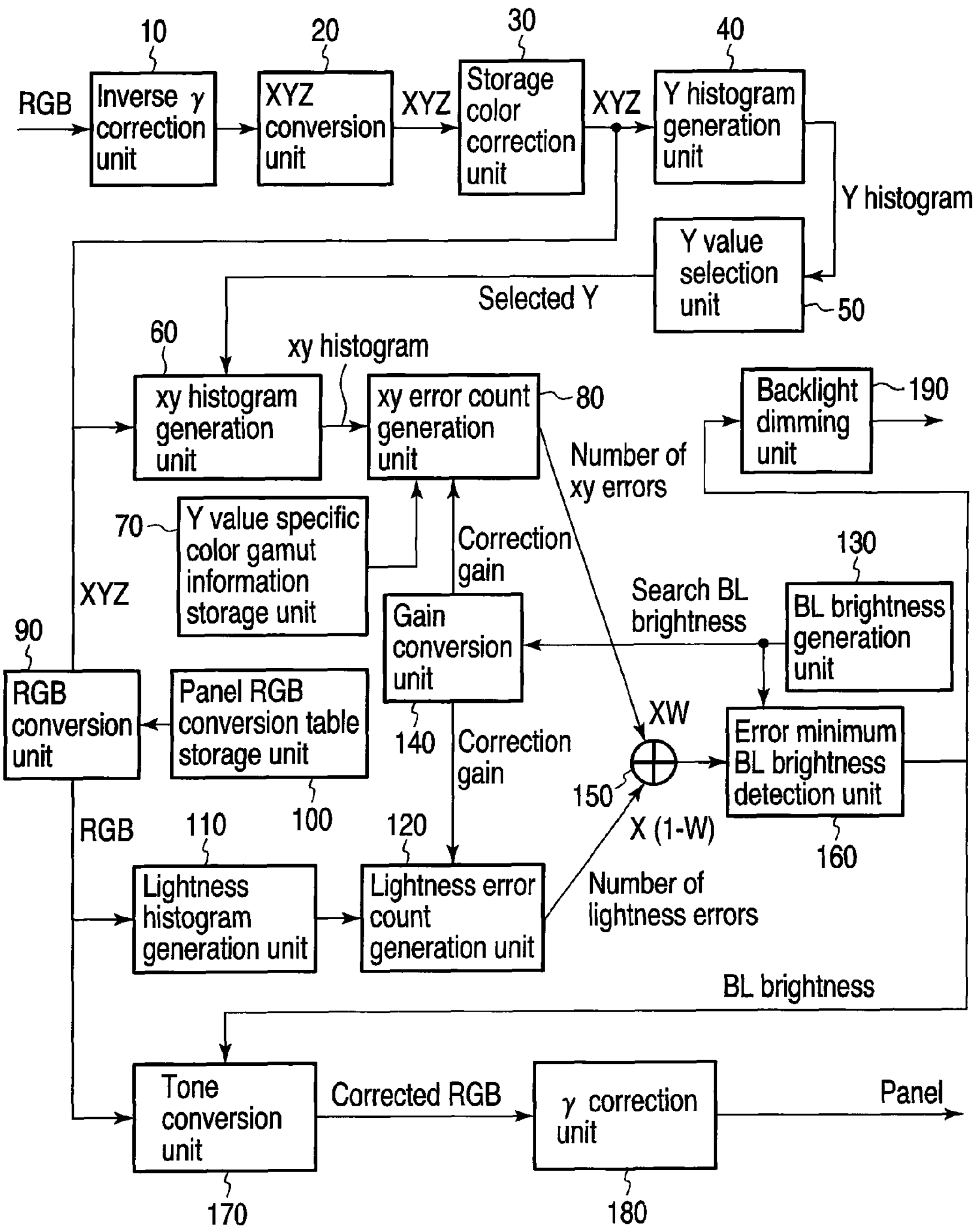
FIG. 1 is a block diagram showing the arrangement of an image display apparatus including an image processing apparatus according to an embodiment of the present invention.

FIG. 1 shows the arrangement of an image display apparatus including an image processing apparatus according to an embodiment of the present invention.

Note that the image display apparatus is generally used for a cellular phone or a personal computer and processes RGB signals by decoding a moving image or a still image using a video codec.

An inverse γ correction unit 10 performs inverse γ correction for the RGB values of an input signal, thereby converting them into RGB values to be linearly reproduced on a display panel (not shown) such as an LCD (Liquid Crystal Display).

For example, when the display panel has $\gamma=2.2$ and maximum tone=255 (24-bit RGB), the inverse $\gamma$ correction unit 10 performs conversion by $$R=255\times(Rin/255)^{\wedge}2.2$$

$$G=255\times(Gin/255)^{\wedge}2.2$$

$$B=255\times(Bin/255)^{\wedge}2.2$$

where Rin, Gin, and Bin are the RGB values of the respective colors of the input signal, and R, G, and B are the output signals of the respective colors.

An XYZ conversion unit 20 converts the RGB values output from the inverse $\gamma$ correction unit 10 into tristimulus values X, Y, and Z for each pixel of every frame, thereby obtaining ideal values. This conversion is done using, e.g., the following general formulas of RGB-XYZ conversion, i.e., RGB-CIE XYZ (CCIR709) conversion formulas.

$$X=0.412R+0.358G+0.180B$$

$$Y=0.213R+0.715G+0.072B$$

$$Z=0.019R+0.119G+0.950B$$

A storage color correction unit 30 corrects the tristimulus values X, Y, and Z output from the XYZ conversion unit 20. The storage color correction unit 30 performs color conversion of enhancing a specific color by, e.g., making each pixel having a chromaticity (X,Y,Z) near green approach the chromaticity of the primary color point of green to obtain a more vivid color for the leaves of trees and plants.

A first histogram generation unit 40 adds, for each Y, the frequencies of the tristimulus values X, Y, and Z in one frame corrected by the storage color correction unit 30 based on, first histogram [Y]+=1 thereby obtaining a first histogram.

Normally, the Y value takes a value from 0 to 100. For example, when one frame includes 1,000 pixels each having a Y value of 100, the number of elements 100 of the first histogram is 1,000, and the first histogram [100]=1000.

A Y value selection unit 50 selects a characteristic Y value such as a value corresponding to the maximum frequency or an average value from the first histogram generated by the first histogram generation unit 40.

A chromaticity histogram generation unit 60 obtains an xy histogram (two-dimensional) that is a chromaticity for each Y value selected by the Y value selection unit 50 based on the tristimulus values X, Y, and Z of one frame corrected by the storage color correction unit 30 in accordance with $$x=X/(X+Y+Z)$$

$$y=Y/(X+Y+Z).$$

When three Y values are selected, three xy histograms are generated. An xy histogram is generated by counting the frequency for each of the x and y values of each pixel by

*xy* histogram [*x*,*y*]+=1

A Y value specific color gamut information storage unit 70 stores Y value specific color gamut information. The Y value specific color gamut information represents the displayable xy distribution specific to a Y value of the display panel and is obtained in advance based on the display characteristics of the display panel.

Figure 2:
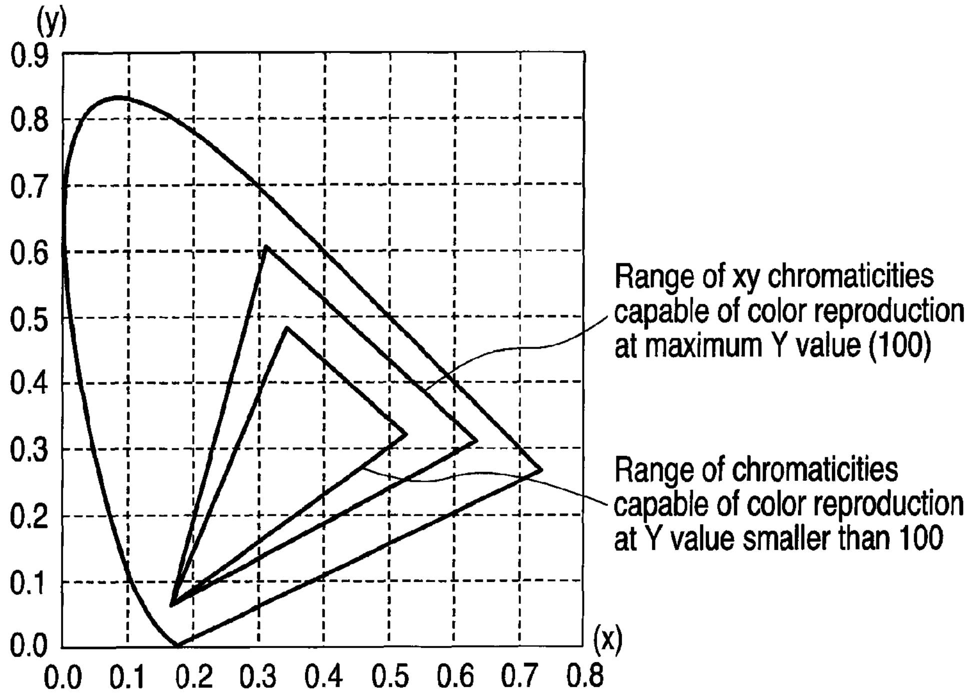
FIG. 2 is a graph showing the relationship between Y values and color gamut.

More specifically, the Y value specific color gamut information is obtained by causing a measuring device to measure XYZ values upon displaying all RGB combinations and obtaining a combination of x and y for each Y value based on the measurement result. In, e.g., an LCD panel, the xy characteristic narrows the color gamut (chromaticity) as the Y value becomes smaller, as shown in FIG. 2. Note that the outermost horseshoe shape in FIG. 2 is an XYZ diagram that is the CIE standard colorimetric system defined by the CIE (Commission Internationale de l'Eclairage), and represents the human visual range.

An xy error count generation unit 80 compares, in each frame, the Y value specific color gamut information stored in the Y value specific color gamut information storage unit 70 with the xy histogram obtained by the chromaticity histogram generation unit 60, and obtains, as the number of xy errors, the frequency of xy values outside the color gamut reproducible on the display panel for each backlight brightness of the display panel.

Note that the Y value specific color gamut information the xy error count generation unit 80 reads out from the Y value specific color gamut information storage unit 70 for the comparison does not correspond to the Y value selected by the Y value selection unit 50. Instead, the xy error count generation unit 80 reads out Y value specific color gamut information corresponding to a Y value obtained by correcting the selected Y value using a correction gain supplied from a gain conversion unit 140. In the characteristic shown in FIG. 2, the higher the correction gain is, the larger the Y value is. This widens the color gamut and decreases the number of xy errors.

On the other hand, an RGB conversion unit 90 reconverts the XYZ values of each pixel in every frame into RGB values based on a conversion table stored in a panel RGB conversion table storage unit 100 so that the pixels are displayed in ideal XYZ values. This processing is performed because the XYZ values on the display panel are not ideal values obtained by the general formulas because of the color gamut that changes depending on the Y value, as shown in FIG. 2. The conversion table is a reverse lookup table for converting XYZ values into RGB values, which is created based on the RGB characteristic of the display panel obtained in advance.

A lightness histogram generation unit 110 obtains the lightness histogram (one-dimensional) of each frame based on the reconverted RGB values. Out of the RGB values of each pixel, a maximum value RGBmax is used as the lightness. More specifically, the lightness histogram is obtained for all pixels included in one frame by Lightness histogram [*RGB*max]+=1

Figure 3:
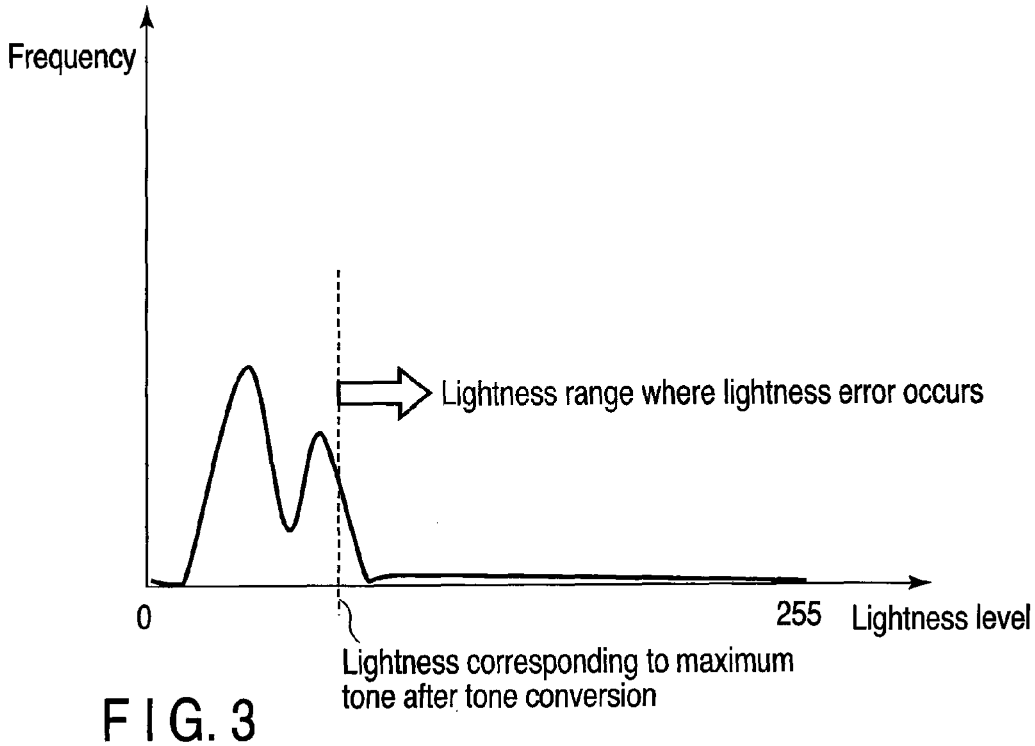
FIG. 3 is a graph showing a lightness histogram.

A lightness error count generation unit 120 counts, from the lightness histogram obtained by the lightness histogram generation unit 110, the frequency of lightnesses higher than the maximum tone that is displayable after lightness correction using the correction gain obtained by the gain conversion unit 140, thereby obtaining the number of lightness errors. As the BL (backlight) brightness rises, and the correction gain becomes smaller accordingly, the lightness corresponding to the maximum tone after correction lowers. For this reason, in the characteristic shown in FIG. 3, the number of lightness errors, which is the cumulative sum of lightnesses corresponding to tones higher than the maximum tone, increases.

To obtain an appropriate backlight brightness, a BL brightness generation unit 130 sequentially generates a backlight brightness to be evaluated (to be referred to as a search BL brightness hereinafter) by changing it stepwise from, e.g., 0% to 100%.

The gain conversion unit 140 generates a correction gain corresponding to the search BL brightness generated by the BL brightness generation unit 130 and outputs it to the xy error count generation unit 80 and the lightness error count generation unit 120. Note that the correction gain is used to obtain a Y value which ensures a brightness corresponding to a backlight brightness of 100%. For example, if the search BL brightness is 50%, a brightness corresponding to a backlight brightness of 100% is obtained by doubling the Y value upon panel display. Hence, the correction gain is set to 2.

An adder 150 adds a value obtained by multiplying the number of xy errors obtained by the xy error count generation unit 80 by a weight coefficient W (0<W<1) and a value obtained by multiplying the number of lightness errors obtained by the lightness error count generation unit 120 by a weight coefficient (1−W). To place focus on the color reproductivity, the value of the weight coefficient W is made large. On the other hand, to place focus on the brightness, the weight coefficient W is made small.

An error minimum BL brightness detection unit 160 receives the search BL brightnesses from the BL brightness generation unit 130 and detects a search BL brightness that minimizes the sum from the adder 150.

Ideal display can be done when both the number of xy errors and the number of lightness errors are as small as possible. More specifically, when the number of xy errors is small, the number of pixels displayed out of ideal colors is small. When the number of lightness errors is small, the brightness of light part is maintained better.

Hence, both the two error counts are preferably small. However, the characteristics of the LCD panel exhibit a tendency to increase the number of lightness errors but decrease the number of xy errors as the backlight brightness lowers. An optimum BL brightness is therefore obtained by the above-described weighted addition of the adder 150.

A tone conversion unit 170 performs tone conversion of the RGB signals of each pixel output from the RGB conversion unit 90 such that the maximum brightness on the display panel equals a backlight brightness of 100% when the search BL brightness detected by the error minimum BL brightness detection unit 160 is employed as the backlight brightness of the display panel. For example, if the detected search BL brightness is 50%, the RGB signals of each pixel are doubled by tone conversion.

A γ correction unit 180 performs γ correction of the RGB signals output from the tone conversion unit 170 in accordance with the γ characteristic of the display panel. For example, when the display panel has γ=2.2 and maximum tone=255 (24-bit RGB), the γ correction unit 180 performs conversion by $$Rout=255\times(R/255)^{\wedge}0.45$$

$$Gout=255\times(G/255)^{\wedge}0.45$$

$$Bout=255\times(B/255)^{\wedge}0.45$$

where Rout, Gout, and Bout are the RGB values of the respective colors of the output signal, and R, G, and B are the signals of the respective colors output from the tone conversion unit 170.

A backlight dimming unit 190 controls the backlight brightness of the display panel in accordance with the search BL brightness detected by the error minimum BL brightness detection unit 160.

As described above, the image display apparatus having the above-described arrangement converts the RGB values of each pixel into ideal tristimulus values X, Y, and Z in each frame, and obtains the number of chromaticity errors for each of a plurality of backlight brightnesses based on the chromaticity histogram of the tristimulus values X, Y, and Z and the color gamut for each Y value corrected in accordance with the backlight brightness. Additionally, a lightness histogram is created from the RGB signals in each frame. Based on the histogram and lightnesses higher than the maximum tone when corrected in accordance with the backlight brightness, the number of lightness errors is obtained for each of the plurality of backlight brightnesses. An optimum backlight brightness is decided based on the number of chromaticity errors and the number of lightness errors, and tone conversion is performed in accordance with the backlight brightness.

Hence, according to the above-described image processing apparatus, an optimum backlight brightness is decided in consideration of the number of chromaticity errors and the number of lightness errors corresponding to a backlight brightness. Then, tone conversion according to the backlight brightness is performed. It is therefore possible to ensure color reproductivity when improving the tonality of a low tone image.

Note that the present invention is not exactly limited to the above embodiments, and the constituent elements can be modified in the stage of practice without departing from the spirit and scope of the invention. Various inventions can be formed by properly combining a plurality of constituent elements disclosed in the above embodiments. For example, several constituent elements may be omitted from all the constituent elements described in the embodiments. In addition, constituent elements throughout different embodiments may be properly combined.

For example, in the above-described embodiment, the xy error count generation unit 80 targets all chromaticities. However, the present invention is not limited to this. As can be seen from the characteristics of the LCD panel, the smaller the Y value is, the narrower the color gamut is. This makes it difficult to obtain a backlight brightness at which the number of xy errors is 0 unless the image is an achromatic gray image. If the Y value used to measure the number of xy errors is small, the number of xy errors cannot decrease, resulting in a poorer color reproductivity improving effect. For this reason, the xy error count generation unit 80 may count the number of xy errors for, e.g., only the xy chromaticity of a flesh color that is important in image display.

Additionally, various changes and modifications may be made without departing from the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

a conversion unit which converts RGB values of each pixel into ideal tristimulus values X, Y, and Z;

a first histogram generation unit which obtains a first histogram by adding frequencies of the tristimulus values X, Y, and Z of one frame for each Y;

a Y value selection unit which selects a characteristic Y value based on the first histogram;

a chromaticity histogram generation unit which generates a chromaticity histogram for each Y value selected by the Y value selection unit;

a color gamut information storage unit which stores, for each Y value, information of a color gamut representing a distribution of chromaticities displayable on a display panel;

a chromaticity error count detection unit which obtains, for each backlight brightness, a frequency of a histogram out of a color gamut based on information of a color gamut corresponding to a value obtained by correcting the Y value selected by the Y value selection unit using a correction gain corresponding to the backlight brightness and the chromaticity histogram created by the chromaticity histogram generation unit;

a lightness histogram creation unit which creates a lightness histogram from the RGB values of each pixel;

a lightness error count detection unit which obtains, for each backlight brightness, a frequency of a histogram higher than a maximum tone based on a lightness corresponding to the maximum tone after correction using the correction gain corresponding to the backlight brightness and the lightness histogram created by the lightness histogram creation unit;

a decision unit which decides a backlight brightness based on a number of chromaticity errors obtained by the chromaticity error count detection unit and a number of lightness errors obtained by the lightness error count detection unit; and a tone conversion unit which performs tone conversion of the RGB values of each pixel in accordance with the backlight brightness decided by the decision unit.

2. The apparatus according to claim 1, wherein the Y value selection unit selects a value of a maximum frequency of the first histogram as the characteristic Y value.

3. The apparatus according to claim 1, wherein the Y value selection unit selects an average value of the first histogram as the characteristic Y value.

4. The apparatus according to claim 1, wherein the decision unit decides the backlight brightness based on values obtained by weighting the number of chromaticity errors obtained by the chromaticity error count detection unit and the number of lightness errors obtained by the lightness error count detection unit.

5. The apparatus according to claim 1, wherein the chromaticity error count detection unit obtains, for a preset chromaticity, the frequency of the histogram out of the color gamut for each backlight brightness.

6. The apparatus according to claim 1, wherein the decision unit decides the backlight brightness based on (i) a value obtained by weighting the number of chromaticity errors obtained by the chromaticity error count detection unit by use of W, where $0<W\leqq 1$, and (ii) a value obtained by weighting the number of lightness errors obtained by the lightness error count detection unit by use of $(1-W)$.

7. The apparatus according to claim 1, wherein the decision unit obtains a sum of (i) a value obtained by weighting the number of chromaticity errors obtained by the chromaticity error count detection unit by use of W, where $0<W\leqq 1$, and (ii) a value obtained by weighting the number of lightness errors obtained by the lightness error count detection unit by use of $(1-W)$, and decides a backlight brightness such that said sum becomes minimum.

8. An image processing method executed by an image processing apparatus to perform functions comprising:

converting RGB values of each pixel into ideal tristimulus values X, Y, and Z;

obtaining a first histogram by adding frequencies of the tristimulus values X, Y, and Z of one frame for each Y;

selecting a characteristic Y value based on the first histogram;

generating a chromaticity histogram for each selected Y value;

reading out, from a color gamut information storage unit which stores, for each Y value, information of a color gamut representing a distribution of chromaticities displayable on a display panel, information of a color gamut corresponding to a value obtained by correcting the selected Y value using a correction gain corresponding to a backlight brightness, and obtaining, for each backlight brightness, a frequency of a histogram out of the color gamut based on the information and the generated chromaticity histogram;

creating a lightness histogram from the RGB values of each pixel;

obtaining, for each backlight brightness, a frequency of a histogram higher than a maximum tone based on a lightness corresponding to the maximum tone after correction using the correction gain corresponding to the backlight brightness and the created lightness histogram;

deciding a backlight brightness based on a number of chromaticity errors obtained in the obtaining the frequency of the histogram out of the color gamut and a number of lightness errors obtained in the obtaining the frequency of the histogram higher than the maximum tone; and performing tone conversion of the RGB values of each pixel in accordance with the decided backlight brightness.

9. The method according to claim 8, wherein in the selecting the characteristic Y value, a value of a maximum frequency of the first histogram is selected as the characteristic Y value.

10. The method according to claim 8, wherein in the selecting the characteristic Y value, an average value of the first histogram is selected as the characteristic Y value.

11. The method according to claim 8, wherein in the deciding the backlight brightness, the backlight brightness is decided based on values obtained by weighting the number of chromaticity errors obtained in the obtaining the frequency of the histogram out of the color gamut and the number of lightness errors obtained in the obtaining the frequency of the histogram higher than the maximum tone.

12. The method according to claim 8, wherein in the obtaining the frequency of the histogram out of the color gamut, the frequency of the histogram out of the color gamut is obtained for a preset chromaticity for each backlight brightness.

13. The method according to claim 8, wherein in the deciding the backlight brightness, the backlight brightness is decided based on (i) a value obtained by weighting the obtained number of chromaticity errors by use of W, where $0<W\leqq 1$, and (ii) a value obtained by weighting the obtained number of lightness errors by use of $(1-W)$.

14. The apparatus according to claim 8, wherein in the deciding the backlight brightness, a sum of (i) a value obtained by weighting the obtained number of chromaticity errors by use of W, where $0<W\leqq 1$, and (ii) a value obtained by weighting the obtained number of lightness errors by use of $(1-W)$, is obtained, and a backlight brightness is decided such that said sum becomes minimum.

* * * * *